Sept. 25, 1951 W. A. ENDTER 2,569,041
LATCH
Filed Jan. 12, 1946 2 Sheets-Sheet 1
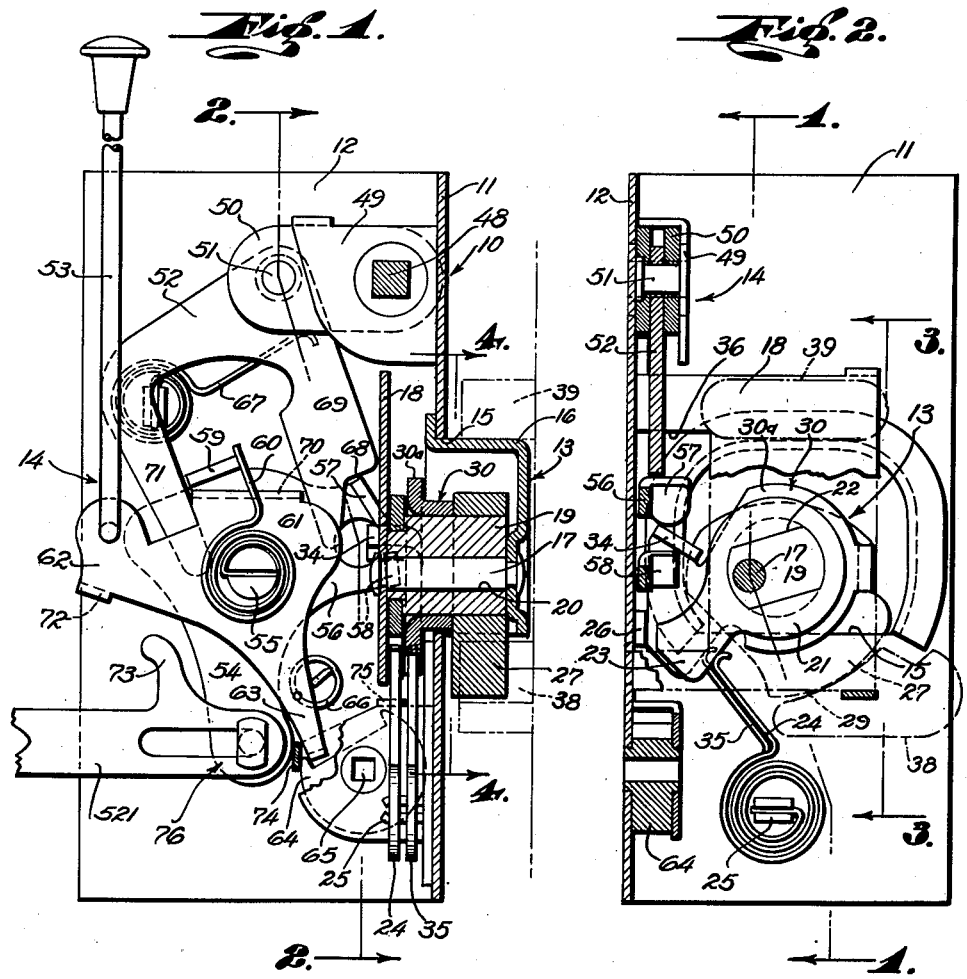
Waldemar A. Endter
INVENTOR.
BY
ATTORNEY Sept. 25, 1951 W. A. ENDTER 2,569,041
LATCH
Filed Jan. 12, 1946 2 Sheets-Sheet 2
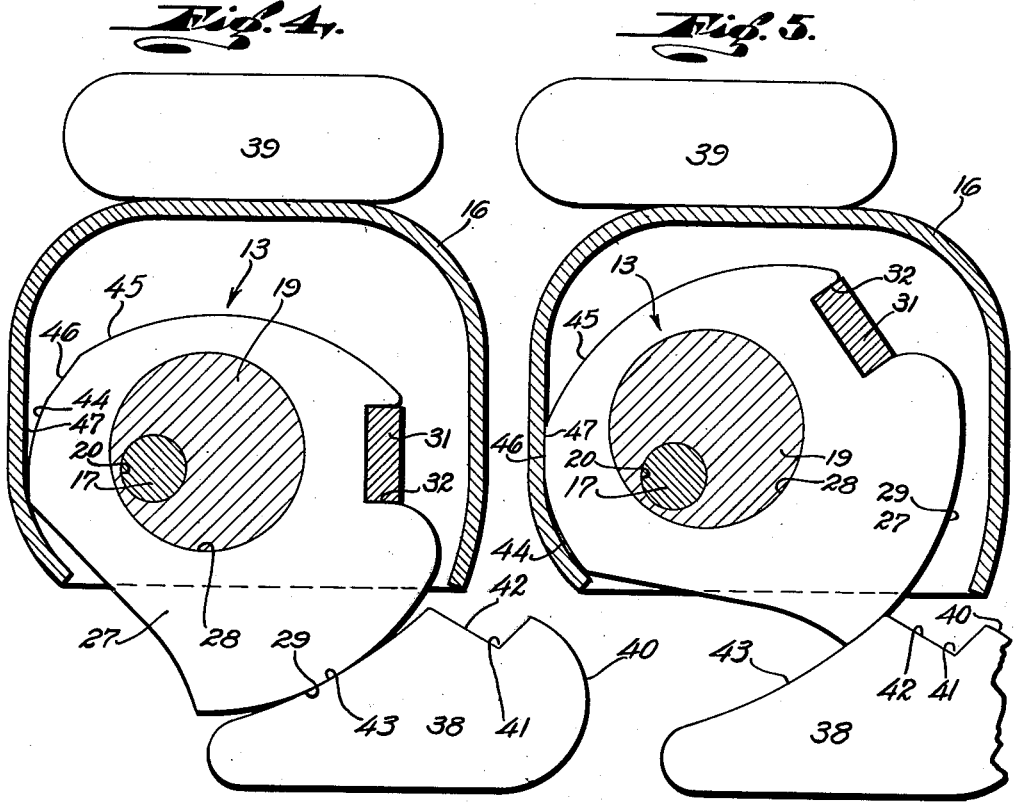
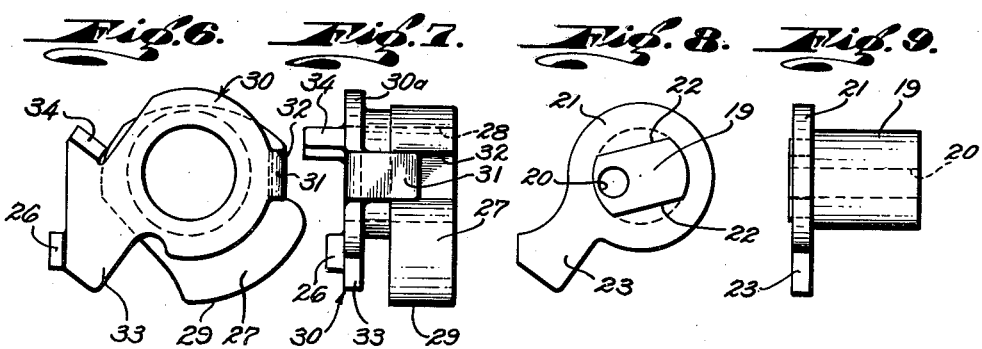
WALDEMAR A. ENDTER
INVENTOR.
BY H. Calvin White
ATTORNEY Patented Sept. 25, 1951

2,569,041

UNITED STATES PATENT OFFICE 2,569,041

LATCH

Waldemar A. Endter, Long Beach, Calif.

Application January 12, 1946, Serial No. 640,859

3 Claims. (Cl. 292—222)

This invention is directed to improvements in latching and locking devices of the general type employing a keeper-engaging bolt mounted for both bodily and pivoted or swinging movement, see for example Patent Number 2,376,992 issued May 29, 1945 to me on Latch Device. More particularly the invention contemplates important advances with respect to devices of the form disclosed in my copending application Serial Number 597,097, filed June 1, 1945, on Latching Mechanism.

In accordance with the invention and as indicated, the bolt has capacity for both bodily and swinging movement, specifically, though typically in the broad aspects of the invention, by virtue of the bolt actuation or support by an eccentric shaft, rotation of which produces bodily displacement of the bolt while the latter retains the ability for indepndent rotative movement. Thus the bolt is rendered capable of independent anti-latching rotation as it enters and is displaced by the keeper, and is given "floating" characteristics by virtue of its capacity for bodily movement productive, under sustained spring pressure and as will later appear, of opposing thrusts against for example the pillar and latch-carrying door members, so as continuously to crowd the door toward tightly closed condition.

One of my primary objectives is to assure retention of the bolt against anti-latching displacement out of the keeper under the influence of conditions such as combined pressure and vibration that might tend to so displace the bolt, by the imposition of anti-latching restraint directly against the bolt or an associated part rotatable with the bolt in its latching or anti-latching movements, and constituting in effect a portion of the bolt structure or assembly.

For the accomplishments of this object, I place in the path of the bolt a stationary abutment engaged by and supporting the bolt during its rotative movements, against the reactive force transmitted by virtue of the bolt thrust against the keeper. Assured retention of the bolt against accidental release is effected by the shapes of the interengaging bolt and abutment surfaces at the stage of the bolt rotation beyond which the bolt movement is to be arrested.

Specifically the invention contemplates forming the bolt with a curved abutment-engaging surface progressively movable against the abutment to an intermediate bolt position, or one short of release from the keeper, at which the bolt and abutment have engaged surfaces which extend in a substantially straight line in the direction of the bolt rotation, and therefore positively block further releasing movement of the bolt by the absence of any wedge relationship between the surfaces that might otherwise permit such movement. Preferably, and conveniently from a manufacturing standpoint, the bolt and abutment have interengaging substantially flat surfaces at the bolt arresting position.

All the features and details of the invention will be understood to better advantage from the following description of a typical and illustrative embodiment shown by the accompanying drawing, in which:

Fig. 1 is a section taken on line 1—1 of Fig. 2 through the bolt assembly, and illustrating in elevation the associated control mechanism;

Fig. 2 is a section on line 2—2 of Fig. 1 and illustrating the bolt in fully latched position;

Fig. 3 is a fragmentary section on line 3—3 of Fig. 2;

Fig. 4 is an enlarged section on line 4—4 of Fig. 1, showing also the keeper parts;

Fig. 5 is a similar view showing the bolt and eccentric shaft in their initially latched positions;

Figs. 6 and 7 are end and side views, respectively, of the bolt and its interfitting control part; and Figs. 8 and 9 are end and side views, respectively, of the eccentric shaft.

For adaptation to an automobile door, the latch mechanism as shown in Figs. 1 and 2, is mounted in a case structure 10 of the usual form comprising right angle flanges 11 and 12, the former of which carries the bolt and shaft assembly 13 at the door edge, flange 12 carrying the bolt control and locking mechanisms generally indicated at 14. Opening 15 in flange 11 contains the outwardly projecting bolt-containing bracket or semi-housing 16, which may be of usual form adapted for reception and confinement between the keeper parts, as later described.

A pin 17 terminally secured within the housing 16 and the stationary deck plate 18, carries an eccentric shaft 19 containing the axially offset pin-receiving bore 20. The eccentric shaft carries a control part which may be in the form of a ring 21 fitted to the inner end portion of the shaft and engaging against its flattened surfaces 22 so that the shaft and ring rotate together. The ring carries an arm 23 engaged by the free end of coil spring 24 mounted at 25 on the case flange 11, the spring thrust tending constantly to rotate the eccentric shaft clockwise as viewed in Fig. 2. When the bolt is not engaged with the keeper, such rotation of the shaft is limited by the engagement of arm 23 with the later described lug 26 on the bolt control part.

The bolt assembly rotatable on the eccentric shaft 19 comprises the bolt proper 27, containing the shaft receiving opening 28 and having a curved keeper-engaging face 29. Associated with the bolt and rotatable therewith relative to the eccentric, is a control part 30 which, for convenience in manufacture and assembly, preferably is made as a separate part assembled in interfitting relation with the bolt for rotation therewith. Referring to Figs. 6 and 7, the control part 30 carries a lug or arm 31 received within recess 32 in the bolt, and shaped to provide an arm 33 carrying lug 34, and a second stop lug 26 engageable as shown in Fig. 2 against the case flange 12 to limit rotation of the bolt in a latching direction. The flange portion 30a of part 30 being disposed at the inside of the flange 11 and housing 16, permits engagement of the arm 33 by the free end of a second coil spring 35 which tends constantly to urge the bolt in a latching direction. Lug 34 projects through opening 36 in the deck 18, for engagement by the later described actuating lever.

Referring to Figs. 4 and 5, the bolt and housing assembly is receivable between vertically spaced stationary keeper 38 and projection or lug 39, mounted for example on the door pillar so that the housing 16 enters the space between the keeper projections by movement from the right and is pressed against the undersurface of the projection 39 by virtue of the bolt thrust against the keeper 38, with resultant formation of a dovetail interlock. During closing movement of the door, the bolt 27 engages the end surface 40 of the keeper to become pivotally deflected upwardly, first to a safety catch position in which the bolt snaps down into recess 41 in the keeper, the bolt then overriding the inclined keeper face 42 to finally assume a fully latched condition in which the bolt face 29 engages the curved keeper surface 43 and the bolt has become cammed toward the keeper by reason of the camming action against the housing of surface 44 which has the illustrated outward curvature in the direction of the bolt rotation.

Being thus deflected as it enters the keeper, the counter-clockwise bolt rotation from an unlatched position produces corresponding rotation of the eccentric shaft 19 with the bolt, by virtue of engagement of lug 26 against arm 23. The bolt displacement accordingly is both bodily and pivotal about the pin 17. By "bodily" movement of the bolt is meant the capacity of all parts of the bolt to have movement relative to the bolt-carrying structure (e. g. door or bolt housing) unconfined to rotation about a center fixed with relation to such structure. Upon reaching the curved keeper surface 43, the bolt and eccentric, being independently rotatable and independently spring urged, may assume different relative pivotal positions depending upon the displaceability of the door toward fully closed position. The tendency of spring 35 is to pivotally thrust the bolt further into or along the keeper, whereas the tendency of spring 24 is to produce relative rotation of the eccentric causing it to exert against the keeper (through the bolt) and against the door member (through the pin 17 and case 10) opposing thrusts acting constantly to crowd the door closed, as against the usual cushion. Meanwhile, however, the reaction of the bolt thrust against the keeper tends to produce counterclockwise or anti-latching rotation of the eccentric, thus disengaging arm 23 from the lug 26 and permitting counterclockwise rotation or back-up motion of the eccentric independent of the rotation of the bolt thereon.

My primary object is to assure against accidental or inadvertent backing out or release of the bolt from the keeper 38, as for example under any combination of forces and vibration applied at the inside of the door and tending to produce anti-latching rotation of the bolt along the keeper surface 43. As previously indicated, this object is accomplished by supporting the bolt during its rotation, against a stationary abutment which receives the reaction of the bolt thrust against the keeper, i. e., the thrust tending to produce anti-latching rotation or back-up motion of the eccentric shaft, and by arresting the resulting anti-latching bodily movement of the bolt at a predetermined point in its travel, by virtue of non-wedging, interengaging surfaces on the bolt and abutment. Referring again to Figs. 4 and 5, the inside face of the housing 16 may be utilized as the stationary abutment engageable, by reason of the bolt reaction thrust, by the curved bolt faces 44 and 45 during the bolt rotation between fully latched and released positions, the normal tendency of the frictional interengagement of the bolt and abutment surfaces being to block and prevent accidental release of the bolt. And ordinarily such interengagement will effectively assure against accidental bolt release. Further assurance is given in accordance with the invention, to anticipate any severe conditions of pressure and vibration that might possibly displace the bolt.

Preferably at an intermediate location along its curved face 44, 45, the bolt surface is flattened at 46 for engagement against the flattened or correspondingly straight line surface 47 of the abutment, the relationship of the flattened surfaces being such that during bolt rotation between the positions of Figs. 4 and 5, the bolt will turn against the abutment along the curved bolt surface 44, but upon reaching the Fig. 5 position, somewhat short of bolt release from the keeper, the straight or flat surfaces 46 and 47 interengage to positively arrest further anti-latching bodily movement of the bolt that could possibly result from its forced or vibrationed engagement against the keeper. It is to be noted that these flattened surfaces, when engaged, are normal to the line of reaction thrust of the shaft (acting through the bolt surface 46) against the abutment resulting from the bolt thrust against the keeper. It also is pointed out that manual anti-latching rotation of the bolt on the eccentric shaft is permissible at all times, even without slightly closing the door from the position shown in Figure 5, because in that position the angle between the flat surface 47 and a line drawn from the center of the eccentric shaft to the intersection of the surfaces 45 and 46 is substantially 90° or more. As the bolt is manually released beyond the position of Fig. 5, the abutment is engaged by the bolt surface 45, or the end portion thereof adjacent to the flat surface 46. It may be mentioned that with the bolt disengaged from the keeper, the eccentric may rotate slightly clockwise from the position shown in Figures 2 and 4, so that the bolt is no longer engaged against the abutment, i. e., there is some clearance therebetween.

The invention contemplates the provision of any suitable means for serving the purposes of the mechanism 14, to manually effect the bolt release from the keeper and to maintain separate combinations of the parts of the entire assembly in locked or ineffective conditions. Merely as illustrative, the mechanism 14 is shown to have the construction and operation more fully developed in my copending application Serial Number 640,860, entitled Lock Control Mechanism and filed on even date herewith. For present purposes, a general description of the operating and control mechanism 14 will suffice.

The control mechanism includes the usual outside handle or operator (not shown) carried on a spindle 48 supported by the bracket 49 and carrying an arm 50 to which is pivotally attached at 51 the bifurcated bodily movable element 52. The usual inside door handle or operator (not shown) reciprocally actuates the link 52I. Also for operation at the inside door is provided the usual push button rod 53. Bolt 27 is operated by a bell crank actuating lever 54 pivoted on the stationary pin 55 and having a bifurcated arm 56 carrying lugs 57 and 58 engaging and receiving between them lug 34 on the bolt control part 30. Thus the bolt and actuating lever 54 are associated or interconnected for rotation, one in response to movement of the other. Lever 54 carries a lug 59 engaged by the end of coil spring 60 carried on the pin 55, the spring tending to urge the lever in an anti-latching direction and to take up looseness in the lever engagement with associated parts.

Pin 55 also carries the pivoted control lever 61 having an arm 62 pivotally attached to the push button rod 53, and having a second arm 63 engageable by the key-controlled rotor 64 carried on spindle 65, to throw the lever between its locking and releasing positions. An over-center coil spring 66 connects arm 63 to the case flange 12.

Rotation of spindle 48 by the outside operator swings link 50 and element 52 down against the resistance of spring 67, producing anti-latching rotation of the bolt by the engagement of shoulder 68 on the arm 69 against the actuating lever lug 57, the starting positions of the parts being as in Fig. 1. The bolt is similarly releasable by operation of the inside door handle, causing movement to the left of link 52I and resultant swinging of lever 54 to rotate its lug 57 against the bolt part arm 34.

To lock the latch mechanism at the inside, depression of the push button rod 53 rotates lever 61 counter-clockwise, causing its lug 70 to engage against arm 71 of the element 52, swinging the latter about pin 50, a distance sufficient to clear shoulder 68 from the lug 57. The outside operator then remains freely rotatable but ineffective to release the bolt. The same rotation of lever 61 locks link 52I against retractive movement by lug 72 being brought down at the outside of and adjacent to the hook-shaped arm 73. As will be apparent, the lever 61 may be key-actuated from the outside of the door and in a manner similar to its operation by the push button lever, by rotation of the key-controlled spindle 65 and rotor 64 to engage and swing arm 63 within the limits presented by the stops 74 and 75. Finally, it may be observed that assuming the door to be opened and with the bolt and control parts in the positions of Fig. 1, the capacity of element 52 for pivotal movement and the lost motion pin and slot connection at 76 between link 52I and arm 54, permit anti-latching rotation of the actuating lever and return of the parts to normal operating positions as the bolt enters the keeper.

I claim:

1. In a latch mechanism for a stationary member and a movable closure member the combination comprising: a shaft mounted for eccentric rotation on one of the members; a bolt mounted for rotation on said shaft and having a convexly-curved keeper-engaging surface and a camming surface peripherally spaced therefrom, rotation of said shaft in one direction being effective to exert opposed thrusts against the one member and the bolt to hold the latter against the keeper and at the same time to move the closure member bodily toward the stationary member; and an abutment on said one member stationary relative to said shaft and bolt and having an extended surface engageable progressively by said camming surface, during latching movements of said bolt against the keeper, to create a reaction force against said shaft that is effective to restrain reverse rotation thereof resulting from the thrust of said bolt against the keeper, said abutment surface being disposed, with respect to the engagement of said bolt with the keeper, on the opposite side of a line connecting the centers of rotation of said shaft and said bolt, said camming and said abutment surfaces having flat portions positioned for engagement in an initially latched position of the bolt and extending, when engaged, normal to the resulting reaction force against said shaft in order to positively prevent reverse rotation thereof.

2. In a latch mechanism for a relatively stationary member and a movable closure member, the combination comprising: a rotatable bolt to be carried by one of said members and engageable with a keeper carried by the other of said members; eccentric means mounting said bolt and exerting opposing thrusts against the bolt and said one member to hold the bolt against the keeper and at the same time to bodily move the closure member toward the stationary member; an abutment on said one member stationary relative to said bolt; and dogging means rotatable with the bolt and engageable progressively with said abutment to create a reaction force against said eccentric means that restrains reverse movement thereof, at least one of the engageable surfaces of said abutment and said dogging means being curved and the line of contact of said abutment and said dogging means being disposed, with respect to the engagement of said bolt with the keeper, on the opposite side of a line connecting the centers of rotation of said eccentric means and said bolt, a tangent to said curved surface at the line of contact of said abutment and said dogging means, when the latter are engaged in a predetermined latched position of said bolt, being disposed normal to the resulting reaction force against said eccentric means.

3. In a latch mechanism for a relatively stationary member and a movable closure member, the combination comprising: a rotatable bolt to be carried by one of said members and engageable with a keeper carried by the other of said members; eccentric means mounting said bolt and exerting opposing thrusts against the bolt and said one member to hold the bolt against the keeper and at the same time to bodily move the closure member toward the stationary member; an abutment on said one member stationary relative to said bolt; dogging means rotatable with said bolt and engageable progressively with said abutment to create a reaction force against said eccentric means that restrains reverse movement thereof, the engagement of said abutment and said dogging means being disposed, with respect to the engagement of said bolt with the keeper, on the opposite side of a line connecting the centers of rotation of said eccentric means and said bolt, the surfaces of said abutment and said dogging means engageable in a predetermined latched position of said bolt being flat and disposed, when engaged, normal to the resulting reaction force against said eccentric means.

WALDEMAR A. ENDTER.

REFERENCES CITED

The following references are of record in the file of this patent:

UNITED STATES PATENTS

| Number | Name | Date |
|---|---|---|
| 670,506 | Dent | Mar. 26, 1901 |
| 1,026,489 | Blake | May 14, 1912 |
| 1,880,585 | Tibbetts | Oct. 4, 1932 |
| 2,234,810 | Simpson | Mar. 11, 1941 |
| 2,329,232 | Van Voorhees | Sept. 14, 1943 |
| 2,376,992 | Endter | May 29, 1945 |

FOREIGN PATENTS

| Number | Country | Date |
|---|---|---|
| 810,192 | France | Mar. 17, 1937 |
| 835,074 | France | Sept. 12, 1938 |